(12) United States Patent
Consul et al.

(10) Patent No.: US 8,620,869 B2
(45) Date of Patent: Dec. 31, 2013

(54) TECHNIQUES TO MANAGE RETENTION POLICY TAGS

(75) Inventors: Ashish Consul, Redmond, WA (US);
Harvey Rook, Redmond, WA (US);
Rajasi Saha, Redmond, WA (US);
Andrew Sullivan, Seattle, WA (US);
Galen Elias, Redmond, WA (US);
Julian Zbogar-Smith, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 575 days.

(21) Appl. No.: 12/237,940

(22) Filed: Sep. 25, 2008

(65) Prior Publication Data
US 2010/0094809 A1 Apr. 15, 2010

(51) Int. Cl.
*G06F 7/00* (2006.01)
*G06F 17/00* (2006.01)

(52) U.S. Cl.
USPC ........................................................ 707/662

(58) Field of Classification Search
USPC ........................................................ 707/662
See application file for complete search history.

(56) References Cited

U.S. PATENT DOCUMENTS

| | | | |
|---|---|---|---|
| 4,899,299 A | 2/1990 | MacPhail | |
| 5,813,009 A | 9/1998 | Johnson et al. | |
| 5,831,611 A * | 11/1998 | Kennedy et al. | 715/763 |
| 5,966,663 A | 10/1999 | Gleason | |
| 6,029,192 A * | 2/2000 | Hill et al. | 709/206 |
| 6,088,720 A | 7/2000 | Berkowitz et al. | |
| 6,115,455 A | 9/2000 | Picard | |
| 6,137,864 A | 10/2000 | Yaker | |
| 7,107,298 B2 | 9/2006 | Prahlad et al. | |
| 7,107,416 B2 | 9/2006 | Stuart et al. | |
| 7,162,512 B1 | 1/2007 | Amit et al. | |
| 7,191,219 B2 | 3/2007 | Udell et al. | |
| 7,594,082 B1 | 9/2009 | Kilday et al. | |
| 2002/0019827 A1 * | 2/2002 | Shiman et al. | 707/200 |
| 2002/0027567 A1 | 3/2002 | Niamir | |
| 2002/0120697 A1 | 8/2002 | Generous et al. | |
| 2002/0156784 A1 * | 10/2002 | Hanes et al. | 707/9 |
| 2003/0126215 A1 * | 7/2003 | Udell et al. | 709/206 |
| 2003/0187938 A1 | 10/2003 | Mousseau et al. | |

(Continued)

FOREIGN PATENT DOCUMENTS

| | | |
|---|---|---|
| EP | 1411736 | 4/2004 |
| WO | WO 2007076715 | 7/2007 |

OTHER PUBLICATIONS

"Configure Retention Settings and AutoArchive in Outlook 2007", Retrieved at<<http://technet.microsoft.com/en-us/library/cc179124(printer).aspx>>, Apr. 28, 2008, pp. 1-4.

(Continued)

*Primary Examiner* — Charles Lu
(74) *Attorney, Agent, or Firm* — Merchant & Gould P.C.

(57) ABSTRACT

Techniques to manage retention policy tags are described. A system may comprise a tagging component operative to tag a message with an expiration tag to form an expiration tagged message, the expiration tag having expiration information used to expire the expiration tagged message in accordance with a retention policy. The system may further comprise a presentation component communicatively coupled to the tagging component, the presentation component operative to present a view of the expiration tagged message with an expiration field having the expiration information for the expiration tagged message.

20 Claims, 12 Drawing Sheets

(56) References Cited

U.S. PATENT DOCUMENTS

| | | |
|---|---|---|
| 2004/0243676 A1 | 12/2004 | Blankenship |
| 2005/0055519 A1* | 3/2005 | Stuart et al. ............... 711/159 |
| 2005/0071435 A1 | 3/2005 | Karstens |
| 2005/0132010 A1 | 6/2005 | Muller |
| 2005/0160227 A1 | 7/2005 | Todd et al. |
| 2005/0216745 A1 | 9/2005 | Speare et al. |
| 2006/0156382 A1* | 7/2006 | Motoyama ................ 726/1 |
| 2006/0195465 A1* | 8/2006 | Atchison et al. ........... 707/102 |
| 2006/0206566 A1 | 9/2006 | Kelley et al. |
| 2006/0218198 A1 | 9/2006 | Brown et al. |
| 2006/0271784 A1 | 11/2006 | Bolosky et al. |
| 2007/0100950 A1 | 5/2007 | Bornstein et al. |
| 2007/0195081 A1* | 8/2007 | Fischer .................... 345/418 |
| 2007/0244892 A1 | 10/2007 | Narancic |
| 2007/0271308 A1* | 11/2007 | Bentley et al. ............ 707/200 |
| 2008/0005204 A1 | 1/2008 | Prus et al. |
| 2008/0016575 A1 | 1/2008 | Vincent et al. |
| 2008/0109448 A1 | 5/2008 | Aboel-Nil et al. |
| 2008/0133486 A1 | 6/2008 | Fitzgerald et al. |
| 2008/0183674 A1 | 7/2008 | Bush et al. |
| 2009/0177704 A1 | 7/2009 | Consul et al. |

OTHER PUBLICATIONS

"Policy for Messaging Services for Government of India", Retrieved at<<https://mail.nic.in/docs/Messaging_Policy_for_NICNET.pdf>>, Government of India, Aug. 2007, pp. 1-10.

Gilliland Art, "E-Mail Archives: Keys to Message Classification and Retention", Retrieved at<<http://www.esj.com/enterprise/print.aspx?editorialsld=2725 >>, Jul. 24, 2007, pp. 1-3.

"Meeting the E-Mail Compliance Challenge with Microsoft Exchange Server 2007 Compliance Requirements for E-Mail and Messaging", 2005, Microsoft Corporation, 21 pgs.

Gellens et al., "POP3 Extension Mechanism", Nov. 1998, 16 pgs.

U.S. Appl. No. 11/971,895, Advisory Action mailed Dec. 7, 2010, 3 pgs.

U.S. Appl. No. 11/971,895, Amendment and Response filed Nov. 28, 2010, 23 pgs.

U.S. Appl. No. 11/971,895, Amendment and Response filed Dec. 15, 2010, 2 pgs.

U.S. Appl. No. 11/971,895, Amendment and Response filed Apr. 17, 2011, 23 pgs.

U.S. Appl. No. 11/971,895, Amendment and Response filed Jul. 19, 2010, 14 pgs.

U.S. Appl. No. 11/971,895, Amendment and Response filed Sep. 24, 2011, 32 pgs.

U.S. Appl. No. 11/971,895, Office Action mailed Dec. 6, 2011, 29 pgs.

U.S. Appl. No. 11/971,895, Office Action mailed Feb. 3, 2011, 19 pgs.

U.S. Appl. No. 11/971,895, Office Action mailed Mar. 22, 2010, 19 pgs.

U.S. Appl. No. 11/971,895, Office Action mailed Jun. 24, 2011, 24 pgs.

U.S. Appl. No. 11/971,895, Office Action mailed Sep. 27, 2010, 24 pgs.

U.S. Appl. No. 11/971,895, Amendment and Response filed Apr. 6, 2012, 18 pages.

U.S. Appl. No. 11/971,895, Office Action mailed Sep. 4, 2012, 22 pages.

* cited by examiner

TECHNIQUES TO MANAGE RETENTION POLICY TAGS

CROSS-REFERENCE TO RELATED APPLICATION

This application is related to commonly owned U.S. patent application Ser. No. 11/971895 titled "RETENTION POLICY TAGS FOR DATA ITEM EXPIRATION," and filed on , Jan. 9, 2008, the entirety of which is hereby incorporated by reference.

BACKGROUND

Electronic mail (email) is an important mode of business communication and increasingly becoming an important information source for litigation. Thus, the need to reproduce email and other documents is important for the individual and the company. A burden placed on any company doing business using email is the ability to reproduce the email. One way is to meet this requirement is to archive all the email. Another way is to impose document retention policies that enable a user to be able to retain email in its present state in the mailbox. This leads to the problem, however, of having huge email mailboxes that continue to grow over time. Furthermore, as the number and rate of incoming emails increases, the users tend to avoid selectively filing the messages in folders. Retention policies provide a technique for controlling this scenario to assist users in managing email, such as retaining or deleting email as desired.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to communications applications, such as messaging applications. Some embodiments are particularly directed to techniques to manage criteria tags, such as retention policy tags or expiration tags, which are designed to implement a retention policy for a messaging application. In one embodiment, for example, a computer-implemented system may comprise a tagging component operative to tag a message with an expiration tag to form an expiration tagged message. The expiration tag may include expiration information used to expire the expiration tagged message in accordance with a retention policy. The computer-implemented system may further comprise a presentation component communicatively coupled to the tagging component. The presentation component may be operative to present a view of the expiration tagged message with an expiration field having the expiration information for the expiration tagged message. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
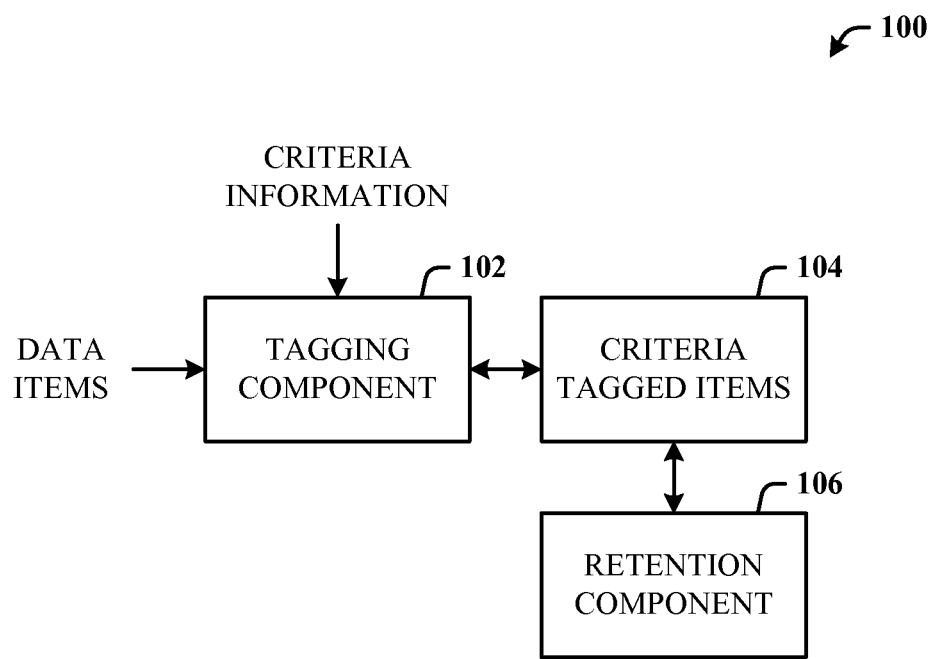
FIG. 1 illustrates an embodiment of a computer-implemented system.

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments are generally directed to techniques for managing criteria tags for implementing a retention policy for a messaging application. The criteria tags may also be referred to herein as retention policy tags or expiration tags. The retention policy tags may be used to automatically retain, copy or delete data items without needing a user to manually reorganize the data items. Retention policy tags can be applied at various levels of data organization, such as individual data items, conversations, folders, distribution lists, and so forth. The retention policy tags may include, among other types of associated information, expiration information (e.g., date, duration) that can be used to determine how long to retain the items and when to delete the items.

Since retention policy tags are robust and may be applied across many data items at varying levels of organization, a user may not understanding what is happening to each message, such as which retention policy has been applied to the message and when it will expire. The users may comprise, for example, knowledge workers or information workers. The user may also not understand what is happening to their mailbox in special scenarios, such as retention hold. Furthermore, a user may find it difficult or cumbersome to add, delete or modify a retention policy for a given message or group of messages.

To solve these and other problems, some embodiments are particularly directed to novel techniques for allowing users to access and apply retention policy tags to data items, such as communications messages or documents. Various user interface views may allow users to find and visually discern precisely when one or more data items are going to expire. Subtle visual cues may be used as unobtrusive reminders for a user of which retention policy has been applied to a data item, thereby allowing a user to determine whether any action is desired for the data item (e.g., modifying its retention policy). Additionally or alternatively, user interface views may also provide users the ability to apply retention policy tags to a data item (e.g., message, document) or groups of data items (e.g., folder, conversation, distribution list) in a seamless manner that enhances a work flow for the user. As a result, the embodiments can improve affordability, scalability, modularity, extendibility, or interoperability for an operator, device or network.

Various embodiments may be implemented in a number of different use scenarios. One embodiment may be used to instantly search and find expiring data items. For example, assume a user is working on a project "Avalon" when she hears from her boss the deadline has been extended six months. The user wants to make sure no mail regarding project Avalon will expire in the next six months. By searching for "Avalon" and "expires in 6 months" she can find expiring mail and extend the expiry date as necessary. Another user needs to make sure that he has not missed applying policy to any important mails. He can quickly scan through his "Search Folder" of mail that is about to expire, identifying messages about to be deleted and retagging them as necessary. One embodiment may be used to provide a clear display of folder policy and reduce display of redundant policy information. For example, a user may use folders to organize her work, and she is easily able to set policy on folders to save her from individually applying policy to messages. One embodiment may be used to provide warnings of imminent expiry of data items. For example, a user may be looking at an old mail which contains many details about the project he is working on. The Retention Policy set on the mail is such that it will expire twelve days from now. He is easily able to tell that and can mark it to keep it longer since he needs it for his day to day business. One embodiment may be used for retention hold notification operations. For example, when a user is placed on retention hold by his company he receives an email from the legal department. Unfortunately he does not find the time to read it due to the volume of incoming email in his inbox. He is still able to remain compliant and aware of the new hold policy because embodiments subtly provide reminders in the user interface. He is able to dismiss the reminder and also click to find more info about the policy. One embodiment may be used to provide warnings to prevent immediate expiry of data items. For example, a user is applying retention policies to her project Avalon folder according to company policy. She is warned that applying the retention policy she selected may cause items in the folder to immediately expire. She checks to see if there is anything that she needs to set an exception on before making the policy change. Other user scenarios may be suitable as well.

FIG. 1 illustrates a computer-implemented system 100 for managing data. The system 100 includes a tagging component 102 for tagging individual items of data with criteria tags to output criteria tagged items 104. A retention component 106 processes retention of the criteria tagged items based on the associated criteria tags. The criteria tags can include criteria information related to time, data type, size of the data, and/or other data properties, for example, that can be manually or programmatically assigned to or associated with the data items. For example, the criteria information can be expiration data that when processed cause deletion of the associated data item. In another example, the criteria information tagged to the data items can be an identifier the user defines, such as PRJ for all data items associated with a project. The user can then search for all data items with the PRJ tag for whatever purpose the user desires.

In one embodiment, the data items can be messages. Examples of messages may include without limitation email messages, short message service (SMS) messages, multimedia messaging service (MMS) messages, chat messages, group messages, text messages, voice messages, video messages, and so forth. The messages may be tagged with expiration tags for expiring the messages according to a time of expiration in accordance with a retention policy.

In support of the tagging component 102 allowing tagging of the data items manually by a user and/or programmatically, the tagging component 102 can reside on a client system for at least user interaction in tagging the desired data items individually, tagging folders of data items, and/or batch mode tagging for operating over many data items at one time. For example, the batch operation can be based on criteria information related to expiration time at which the data time will be expired. The tagging component 102 updates criteria information of the criteria tag based on changed circumstances associated with the corresponding item.

The retention component 106 can be a client-based entity and/or a server-based entity. When tag retention is solely on the client system, the retention component 106 also resides on the client system. For example, the client user can manually tag email messages separately with criteria tags that employ time-based expiration information as a value which can be processed for the retention or deletion of the messages according to one or more policies.

Where the retention component 106 is a server-based entity, criteria tag information can be communicated between the tagging component 102 of the client and the retention component 106 of the server such that the server processes the data items according to the policies. For example, where the criteria tag information is related to retention policies, the retention policy tag (RPT) definitions can be communicated between the client and the server.

In one implementation, RPTs determine when data items such as messages are expired. In another implementation, RPTs (or criteria tags) provide a technique for managing the associated data items for purposes other than retention, such as for grouping, storing, forwarding, and other messaging operations.

In the context of email retention, the user can retain an original email organization scheme provided by default in the email program, customize a new organization scheme, or use both the default and custom scheme. Retention can be facilitated by the capability to expire email by applying RPTs to individual messages or folders of messages.

Other aspects of the disclosed architecture include sorting and searching of the data items based on the expiration date calculated from the RPT. The expiration date on each message indicates to the user exactly when the message expires. The system also provides realtime updating of message expiration dates and batch-mode processing of data items to expire the items as desired and configured. The expiration date can be updated in realtime in response to any relevant user action such as retagging, moving an item to another folder, and other user actions.

An administrator can set an upper-bound on the data items or categories of data items that can be tagged with a specific retention policy tag. This is useful to the server administrator for creating a tag that allows a message to live for a long time but chooses to limit the number of such items.

Figure 2:
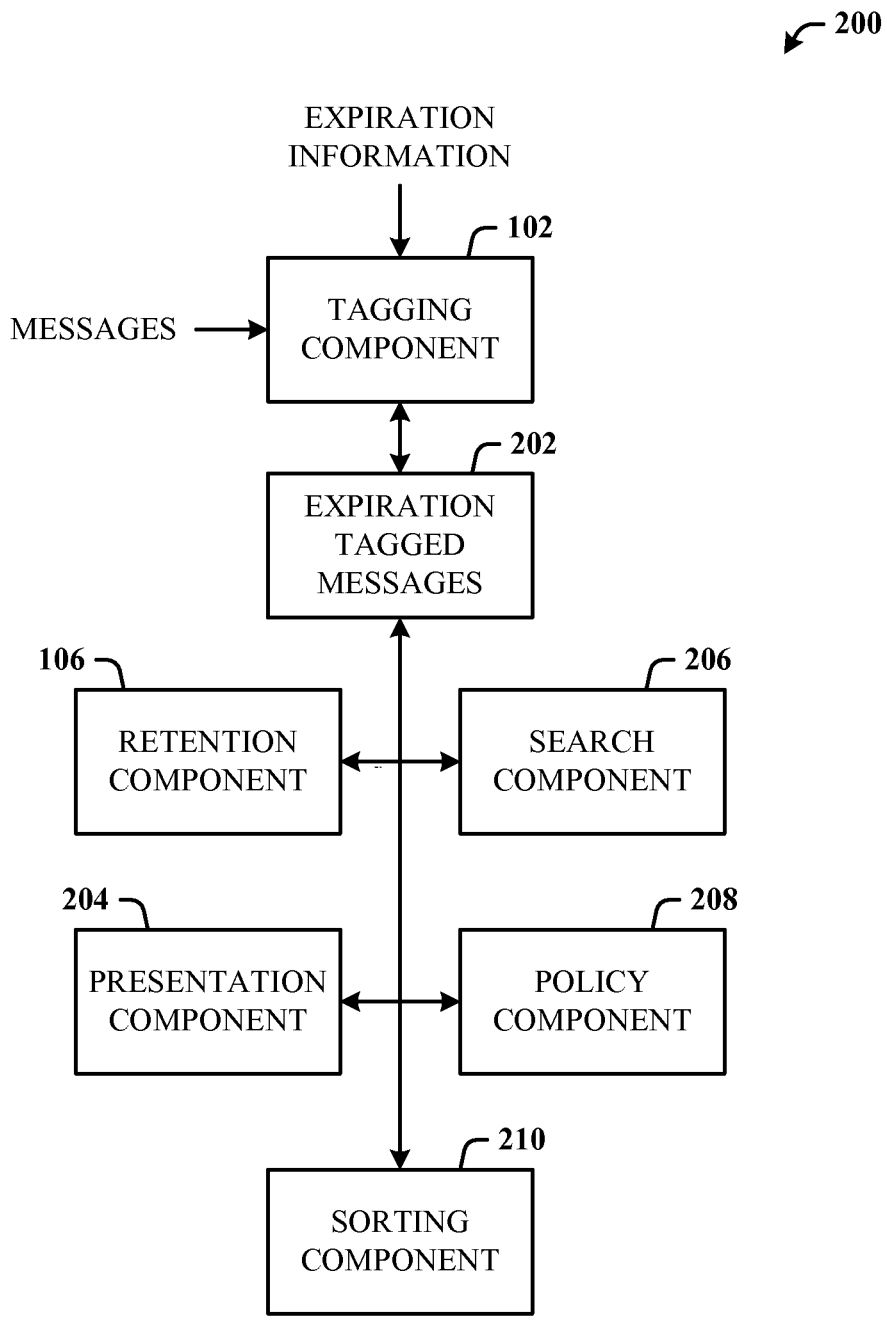
FIG. 2 illustrates an embodiment of a computer-implemented system.

FIG. 2 illustrates a more detailed system 200 for managing data using retention policy tags. The system 200 includes the tagging component 102 for receiving expiration information and data items, such as messages. The user can manually tag the messages, tag a folder of the messages, or a program can automatically tag the messages and/or folders without user intervention. The output of the tagging component 102 is expiration tagged messages 202. The tagged messages 202 may also be referred to as a retention policy tagged messages where the retention policy is based on the expiration information. The retention component 106 processes one or more retention policies against the expiration information in the tagged message. The policies can be defined at the user level, the organizational level, and/or corporate level, for example.

The system 200 can also include a presentation component 204 for presenting various views of data items, the RPTs and expiration information associated with the RPTs, for user interaction therewith. A search component 206 provides the capability of searching the messages based on the expiration information in the RPTs. For example, all messages of a certain date can be searched and processed (e.g., deletion, move to a folder, etc.). A policy component 208 facilitates the generation of policies for management of the messages via the tags for use at the user level, the organizational level, administration level, and/or corporate level, for example. The system 200 can further comprise a sorting component 210 for sorting the messages based on criteria information (e.g., expiration) associated with the criteria tags.

Figure 3:
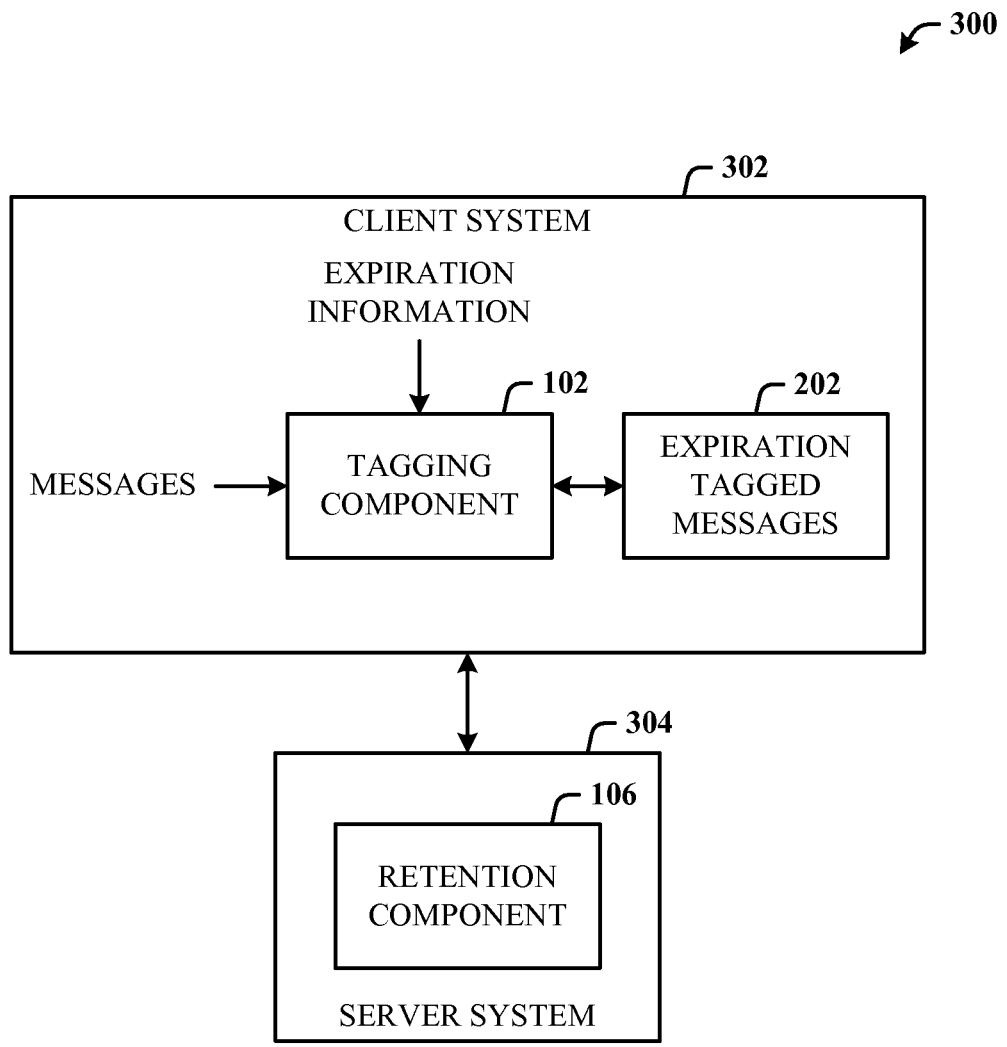
FIG. 3 illustrates an embodiment of a client-server environment.

FIG. 3 illustrates a system 300 that employs tagging and retention processing in a client-server environment. Here, the tagging component 102 resides on a client system 302. The tagging component 102 can be part of a client application such as an email program where the client user can tag email messages individually and/or folders of messages with RPTs. The tagging component 102 receives data items in the form of messages, and expiration information for tagging to the messages and outputting the expiration tagged messages 202. The retention component 106 can reside on a server system 304 from which retention polices can be executed against the tagged messages 202 of the client system 302. RPT definition can be communicated between the client system 302 and the server system 304 using structures referred to as folder associated information (FAI) messages.

Figure 4:
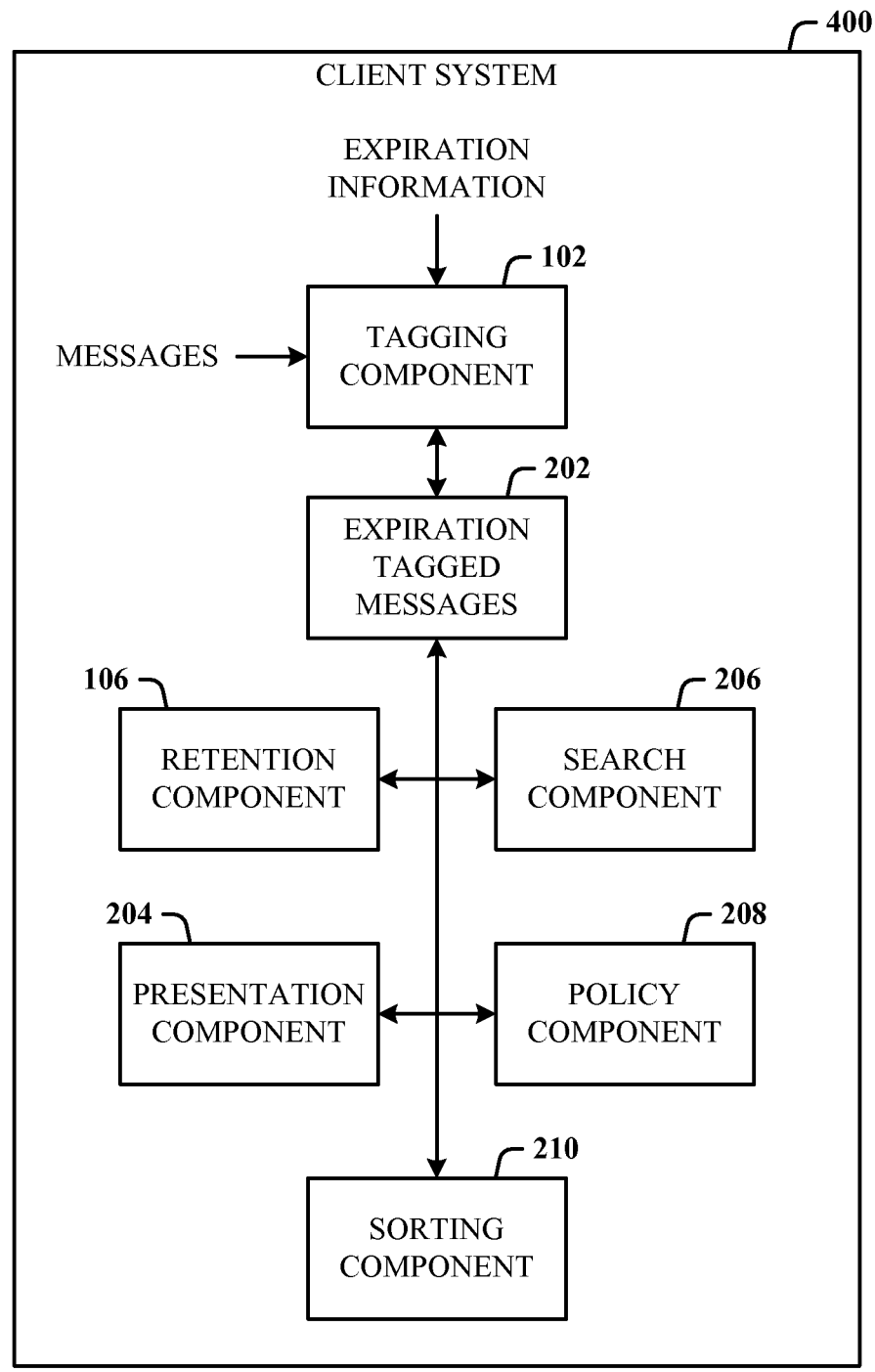
FIG. 4 illustrates an embodiment of a client environment.

FIG. 4 illustrates a client system 400 that employs both tagging component 102 and the retention component 106 for retention processing of client data items. Although described in the context of messages as the data items to be tagged, it is to be understood that the tagging can be applied to many different types of data items, such as audio data, video data, image data, text data, any or all of which can be managed by policies such as for retention. The functionality described in FIG. 2 applies here as embodied totally in the client system 400.

Figure 5:
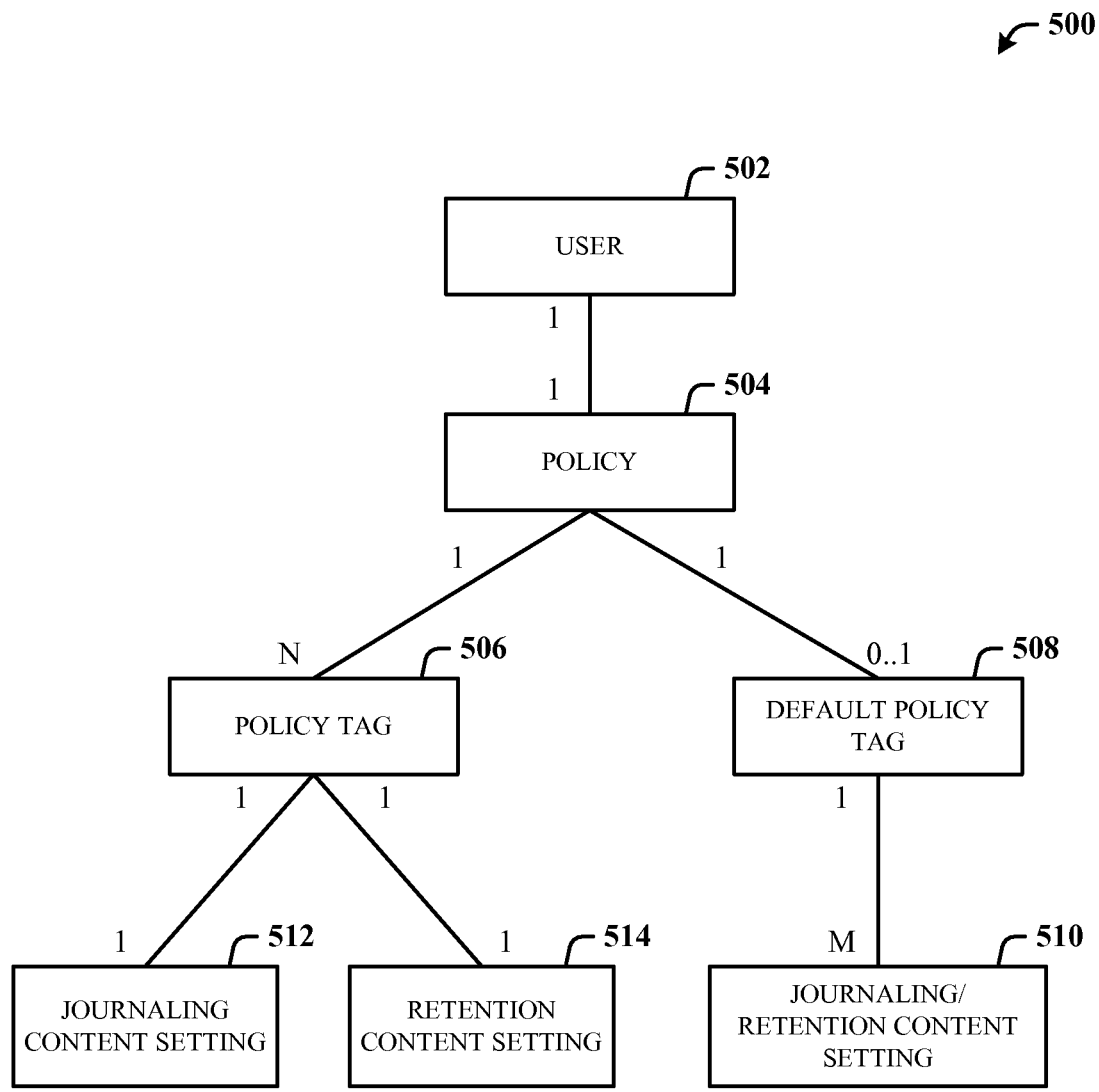
FIG. 5 illustrates an embodiment of a logic diagram.

FIG. 5 illustrates a general relationship diagram 500 for retention policy tag processing. After a message, for example, is tagged explicitly by the user or implicitly by a message records management assistant (e.g., time-based (TBA), event-based (EBA)), the user knows precisely when the message will expire due to the message expiration date on each message in the mailbox. The TBA deletes the message from the mailbox on the expiry date.

The message records management EBA is responsible for keeping the message expiration date correctly updated on each message. Since the message expiration date is stamped as an attribute on each message, this information is easily visible in the client user interface (UI) and the user can sort messages and search the messages based on message expiration. The user can benefit from views that help determine when a message will expire or age out of the mailbox.

There is an associated action for each RPT. Examples of actions may include without limitation a hard delete (e.g., the message is permanently deleted), a soft delete (e.g., the message can be recovered), move to another folder, or journal a message, or other desired actions. An example of journaling a message may comprise forwarding a message to another network address, such as a simple mail transfer protocol (SMTP) address for an archive gateway.

The relationship diagram 500 shows that for each user 502 there is a policy 504. Inside the policy 504 there can exist N policy tags 506 and exactly one default policy tag 508. Associated with the default policy tag 508 are M journaling/retention content settings 510. Journaling involves moving the messages to another location where expiration processing can delete the messages. For example, the default policy tag 508 can be that voice mail stays in the user mailbox for a set period of time (e.g., sixty days) and thereafter, deleted. The user's normal text email can be configured for retention for one year and then is deleted.

The user is offered other choices because the settings may be insufficient for the desired purposes. Thus, associated with each policy tag 506 can be exactly one of a journaling content setting 512 which moves the message to another location (e.g., an archive). Alternatively, the policy tag 506 has exactly one retention content setting 514 which defines that for this particular kind of message, extend the retention (e.g., three years or five years or some other duration other than the default) or reduce the retention to less than the default setting.

Following is a table of exemplary item-level properties that can be employed for RPTs. Note that StartTime, Retention Period, Default Retention Period can be combined together for the consumption and conservation of message property names.

| Property Name | Type | Stamping Details | Comment |
|---|---|---|---|
| StartTime | DateTime | Stamped on every item. Server event-based assistant sets this property. Message program can change. | Add the policy length to the start time to calculate expiry date. |
| RetentionPeriod | Number(in days) | Stamped when item is explicitly tagged. Used to determine if item is explicitly tagged. Message | The length for keeping the item (a value of 0 or −1 means never expire). A specific value may be |

-continued

| Property Name | Type | Stamping Details | Comment |
|---|---|---|---|
| | | program changes the value when explicitly tagged. | used for not-defined. |
| DefaultRetentionPeriod | Number | Stamped on every item by server event-based/time-based assistant - not by client program. | The length to retain an item if under the default policy (can vary based on message class) |
| RetentionDate | DateTime | Stamped on every item. Message program calculates when cached or offline, server stamps when online | DateTime for item expiration. A calculated property when cached or offline, and a property stamped by server when online. |
| Effective PolicyGUID | GUID | Stamped on every item. Message program calculates when cached or offline, server stamps when online. | The policy an item is under (either implicit or explicit). Open FAI item to display policy name. |

Following is a table of exemplary folder-level properties that can be employed for RPTs.

| Property Name | Type | Stamping Details | Comment |
|---|---|---|---|
| PolicyTag | GUID | Stamped on all folders. Message program changes when user explicitly tags a folder, and updates all subfolders with this tag GUID as well. | The policy tag is a GUID |
| Retention Period | Number (days) | Stamped on all folders. Message program changes when user explicitly tags a folder, and updates all the subfolders with the retention period as well. | The length for keeping the item (a value of 0 or −1 it means never expire). |
| ExplicitBit | Number (flag) | Use a new store property called RetentionFlags. This has the explicit bit. If the least significant bit is 0 or if the property is not present, then the tag is implicit. Message program stamps in offline/cached mode. Server stamps for online mode. If the user tags a folder, explicitBit is 0 for each sub-folder and non-zero for the folder that is explicitly tagged. | The bit representing if the RPT is inherited from a parent. |
| Comment | String | Not stamped on folder | Clients pick up the comment from the FAI item based on the client locale. |

Following are rules that can apply. RPT details such as msg_class and corresponding retention period can be retrieved from the FAI item definition. In one embodiment, folder-level tags on system folders are not allowed to be overwritten by the user. In an alternative implementation, the user can override the default policy on system folders. Item-level tags override folders tags. In other words, when a message with an explicit item-level expiry policy is moved to a folder with a folder-level policy, the item-level policy trumps the folder-level policy.

The disclosed architecture provides a precedence ordering technique for determining message expiration. Item-level tags supersede folder-level tags, and default tags apply in the absence of explicit item-level or folder-level tags. As previously indicated, for each RPT there can be up to two associated ContentSettings (one for autocopy and the other for expiration). For each default policy tag, there can be one or more associated content settings. The content settings can be determined by looking at the FAI item.

The ExplicitBit is set to one when the user manually applies a tag to the item. The bit is cleared when the user clears the tag from the item. The message program client stamps the expiry date and RPT on each item when the item does not have explicit retention tag and is moved to another folder, does not have explicit retention tag and the folder-level tag is changed, or does not have explicit retention tag and the folder is moved. The server-side EBA stamps in online or cached mode, and the client stamps in offline mode.

The following example addresses some of the conflict resolution scenarios. Consider a folder hierarchy with a top-level folder F1 and policy P1, a child folder F2 with no policy, a sub-child folder F3 (under F2) with a policy P3.

If a message with no policy is moved to folder F3, the message gets stamped with an expiration date based on policy P3. If the message is moved out of folder F3 to folder F2, folder F2 has no folder-level policy, so messages in folder F2 inherit the policy from the parent, in this case, policy P1 from folder F1. The system event-based assistant then stamps expiration information to the messages based on policy P1.

If a message is then moved out of folder F3 to folder F1, the message is stamped with the expiration date based on policy P1. Now create a new folder F4 under folder F3, and folder F4 has no folder-level expiry policy and move a message (with no assigned item-level policy) to folder F4. The message is tagged with expiration date according to the policy on folder F3 (parent/hierarchy). If policy P4 is stamped on the folder F4, the event-based assistant stamps each message in folder F4 that does not have an item-level policy, with policy P4.

Consider that the user changes policy on folder. In a first example, the folder had a folder-level policy P1 and now the policy is changed to policy P2. The event-based assistant has already stamped all messages in the folder with expiration date based on policy P1. Changing folder-level policy to policy P2 at this time results in the event-based assistant scanning all messages in the folder and stamping expiry dates based on policy P2 on all items that do not have an explicit item-level policy. In a second case, if a folder had no folder-level policy and a policy is explicitly specified on the folder, the event-based assistant will stamp the expiration date on each message that had the default or inherited policy from the parent folder with the new policy. Messages that have explicit item-level policy will not be impacted.

When a server administrator removes a policy or updates the policy such as changing the expiration time, the time-based assistant detects this change and stamps each message in the mailbox. In general, the EBA responds to changes made by the user, and the TBA responds to changes made by the server. For example, if the user moves an item to another folder that causes a change in an item policy, then the EBA will update the tag, expiration date, etc. If the administrator changes the Retention period in a policy, the TBA will update the expiration date on all items with that policy.

As previously described, the computer-implemented system 100 may comprise the tagging component 102. The tagging component 102 may be arranged to receive a message and an expiration tag, and tag the message with the expiration tag to form an expiration tagged message 202. The expiration tag may include expiration information used to expire, delete or otherwise remove the expiration tagged message 202 in accordance with a given retention policy. The presentation component 204 may be arranged to present one or more views of the expiration tagged message 202. The different views may have one or more expiration fields arranged to visually display expiration information associated with the expiration tagged message 202. The various types of views generated by the presentation component 204 may be illustrated and described in more detail with reference to FIGS. 6-9.

Figure 6:
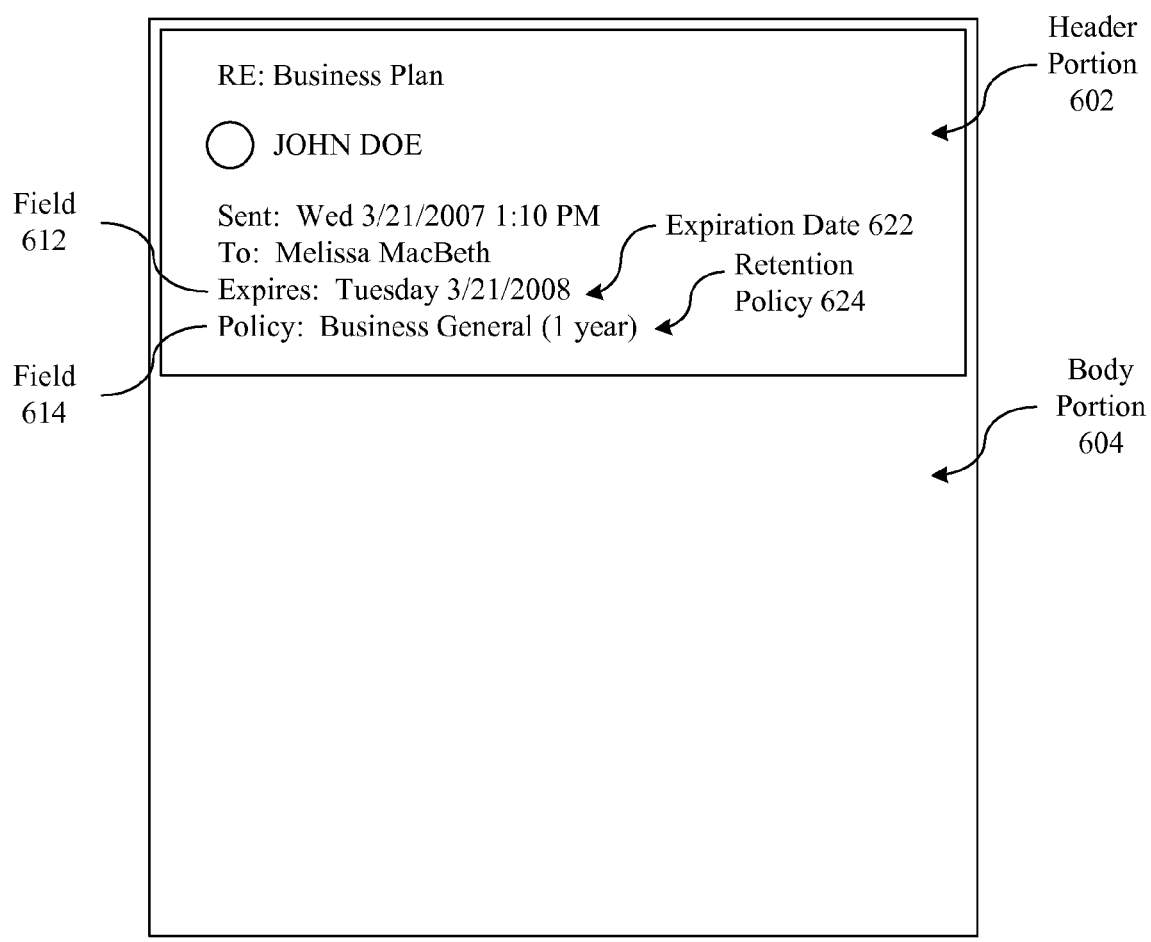
FIG. 6 illustrates an embodiment of a first view.

FIG. 6 illustrates a diagram for a reading pane view 600. The reading pane view 600 provides an exemplary view of the expiration tagged message 202 having a header portion 602 and a body portion 604. The header portion 602 may contain various fields to present or display expiration information associated with an expiration tag for the expiration tagged message 202. The expiration information may comprise different types of information relevant to processing and expiring the expiration tagged message 202 in accordance with a given retention policy. Examples of expiration information may include an expiration time, an expiration day, an expiration date, a retention policy type, a retention policy description, and other desired expiration information. Although the reading pane view 600 illustrates expiration information presented as part of the header portion 602, the expiration information may be presented in different portions of the expiration tagged message 202 for the reading pane view 600, as well as other views. The embodiments are not limited in this context.

In embodiments, the presentation component 204 may be operative to present the reading pane view 600 of the expiration tagged message 202 with one or more expiration fields 612, 614 positioned in the header portion 602 for the expiration tagged message 202. For example, in the illustrated embodiment shown in FIG. 6, the header portion 602 contains expiration fields 612, 614 for the expiration tagged message 202. The expiration fields 612, 614 may be used to visually display expiration information for the expiration tagged message 202. For example, the expiration fields 612, 614 may display an expiration date 622 and a retention policy type 624, respectively. In this manner, a user can quickly assess a retention state for the expiration tagged message 202 to determine whether any corrective action is needed. It may be appreciated that any number of expiration fields and expiration information may be used for the reading pane view 600, and the embodiments are not limited in this context.

Figure 7:
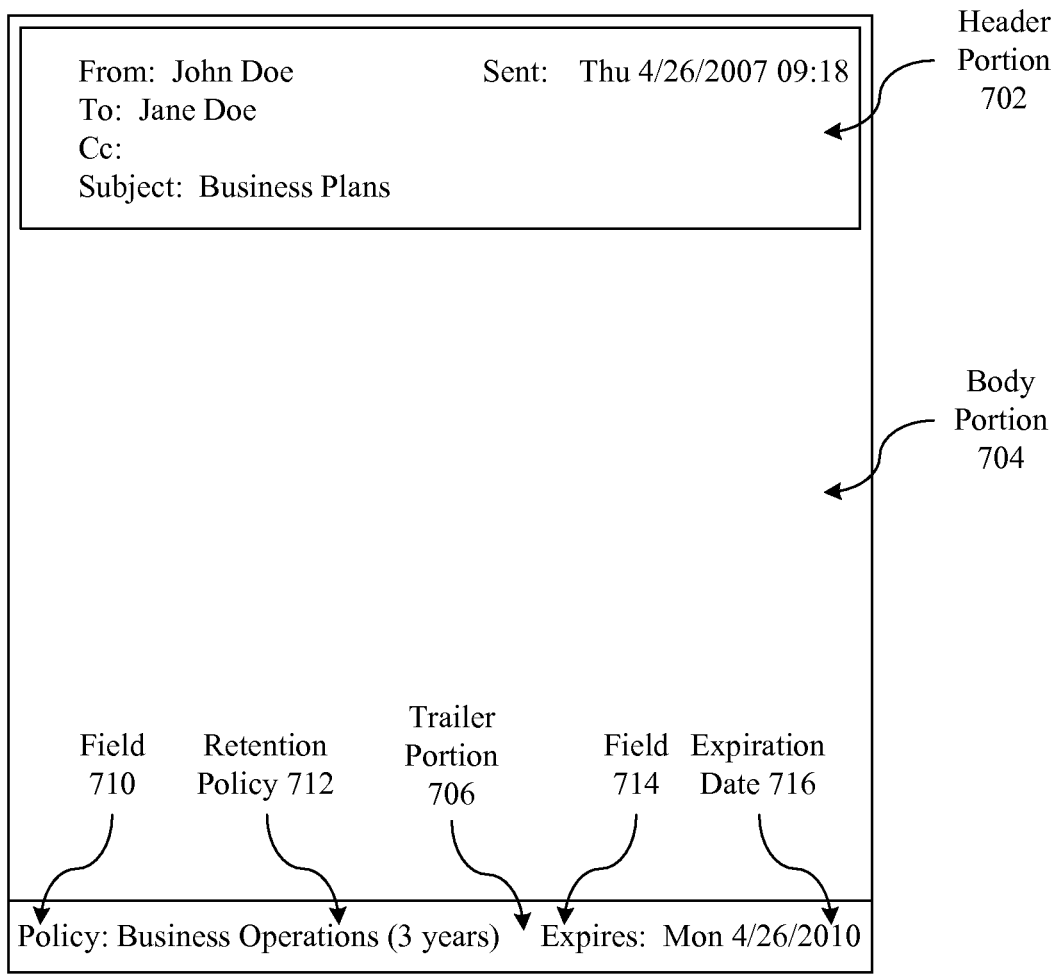
FIG. 7 illustrates an embodiment of a second view.

FIG. 7 illustrates a diagram for an inspector view 700. The inspector view 700 provides an exemplary view of the expiration tagged message 202 having a header portion 702, a body portion 704, and a trailer portion 706. Similar to the reading pane view 600, the inspector view 700 presents expiration information for the expiration tagged message 202. Rather than displaying the expiration information in the header portion 702, however, the inspector view 700 presents expiration information in the trailer portion 706. The trailer portion 706 is sometimes referred to as a "branding" portion.

In embodiments, the presentation component 204 may be operative to present the inspector view 700 of the expiration tagged message 202 with one or more expiration fields 710, 714 positioned in the trailer portion 706 for the expiration tagged message 202. For example, in the illustrated embodiment shown in FIG. 7, the trailer portion 706 contains expiration fields 710, 714 for the expiration tagged message 202. The expiration fields 710, 714 may be used to visually display expiration information for the expiration tagged message 202. For example, the expiration fields 710, 714 may display a retention policy type 712 and an expiration date 716, respectively. Positioning the expiration information in the trailer portion 706 allows a user to quickly obtain expiration information for the expiration tagged message 202 while potentially reducing visual disruptions to workflow for an information worker. It may be appreciated that any number of expiration fields and expiration information may be used for the inspector view 700, and the embodiments are not limited in this context.

Figure 8:
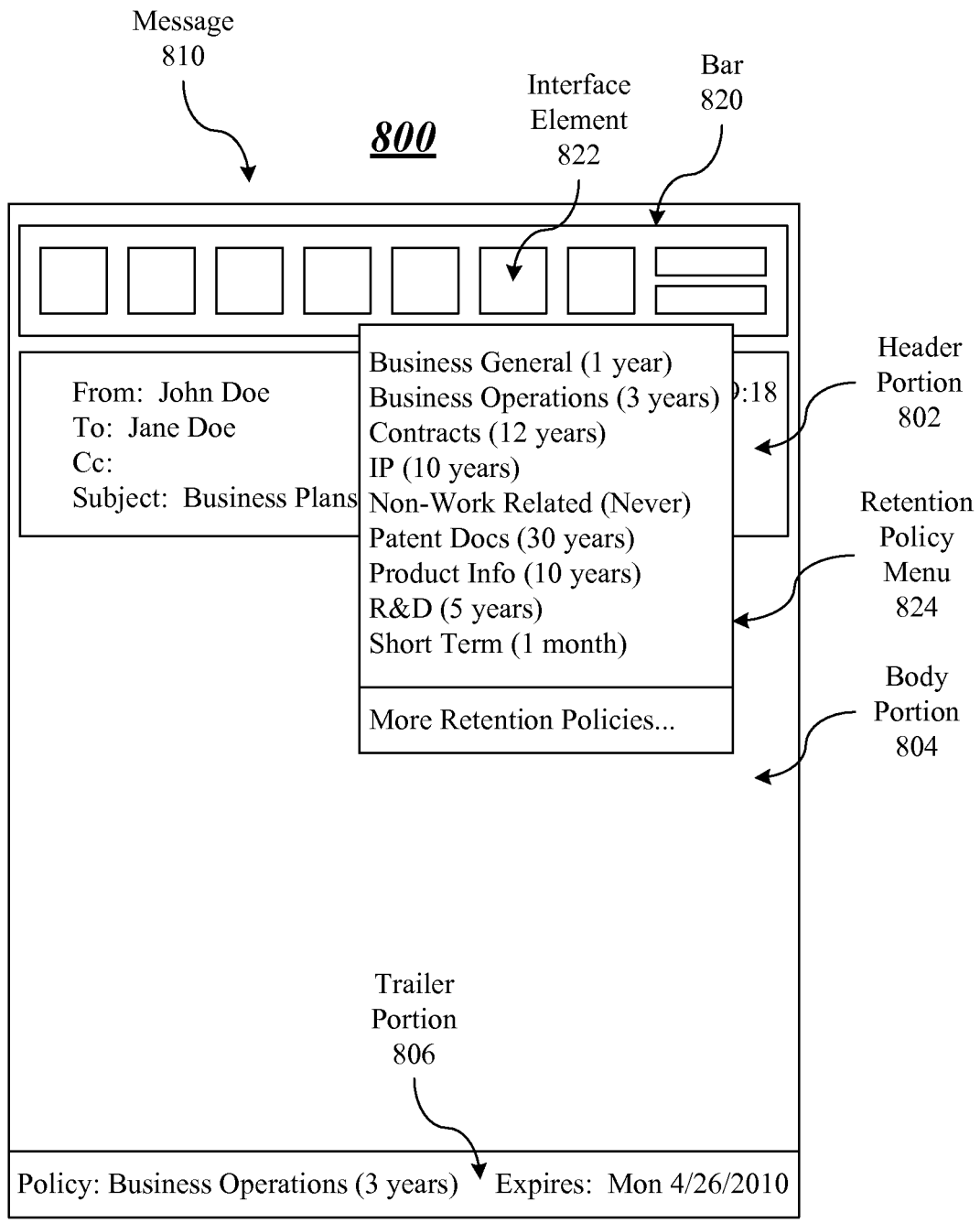
FIG. 8 illustrates an embodiment of a third view.

FIG. 8 illustrates a diagram for a compose inspector view 800. The compose inspector view 800 provides an exemplary view of a message 810 prior to performing tagging operations. The message 810 may comprise a header portion 802, a body portion 804, and a trailer portion 806.

In embodiments, the presentation component 204 may be operative to present the compose inspector view 800 of the message 810 with a ribbon bar 820. The ribbon bar 820 may comprise various interface elements used to activate certain operations for the message 810. For example, in the illustrated embodiment shown in FIG. 8, the ribbon bar 820 may include, among other interface elements, a retention policy interface element 822. When the retention policy interface element 822 is activated, such as selection by a user, the compose inspector view 800 may present a retention policy menu 824 with a list of retention policies available for the message 810. The presentation component 204 may receive a selection for one of the retention policies from the retention policy menu 824, and output the selected retention policy to the tagging component 102. The tagging component 102 may receive the selected retention policy, and tag the message 810 with an expiration tag to form the expiration tagged message 202. The expiration tag may include expiration information used to expire the expiration tagged message 202 in accordance with the selected retention policy.

Although the compose inspector view 800 is shown with the ribbon bar 820 with the interface element 822 that may be used to select a retention policy for the message 810, it may be appreciated that the ribbon bar 820 may be implemented for other views for the message 810. For example, the ribbon bar 820 may be implemented as part of a reading pane view, an inspector view, a shell view and other views of the message 810, thereby allowing a user to select and tag the message 810 with a desired retention policy in a seamless workflow manner.

Figure 9:
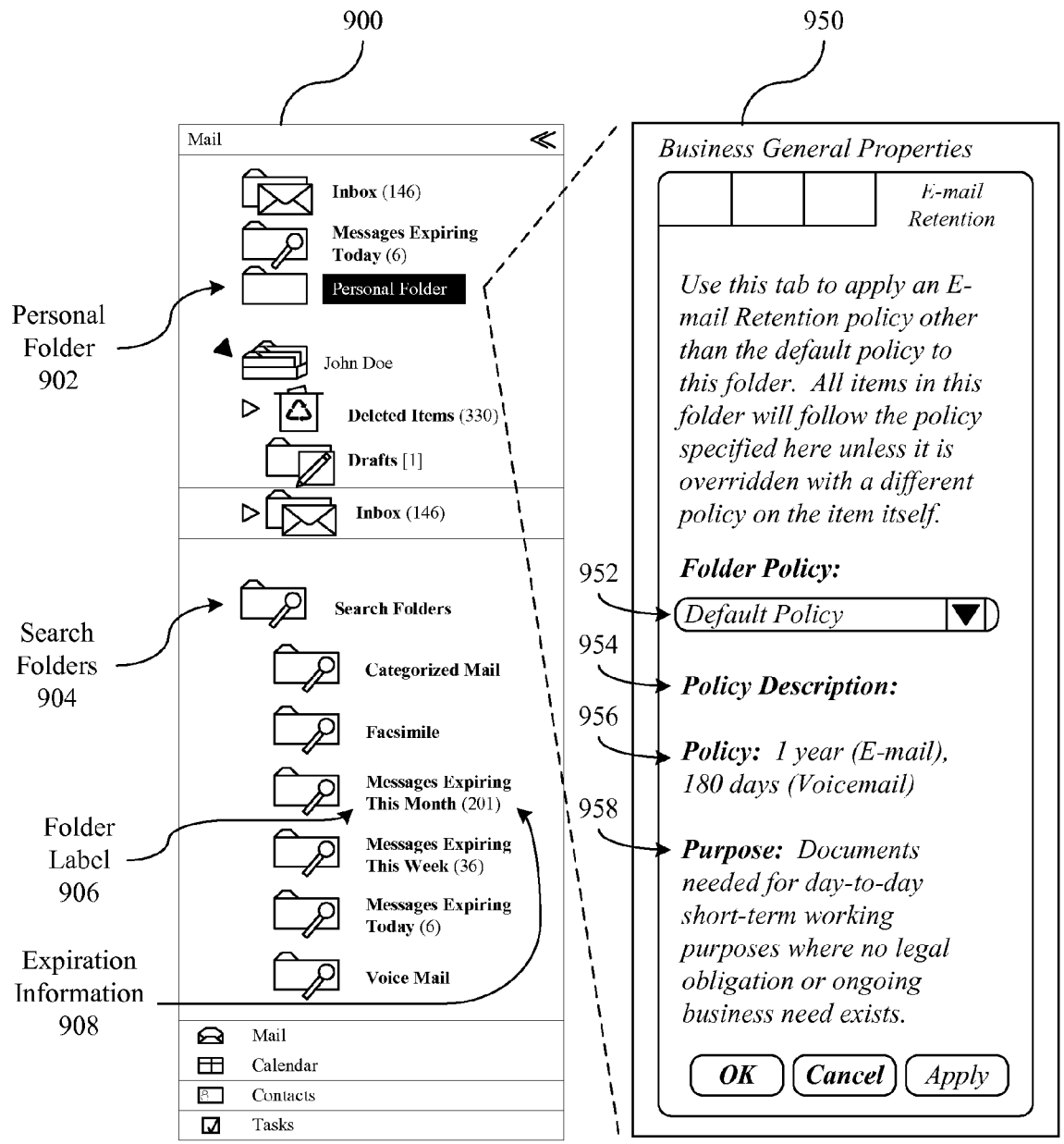
FIG. 9 illustrates an embodiment of a fourth view.

FIG. 9 illustrates a diagram for a shell view 900. The shell view 900 provides an exemplary view of various data items and folders for a message application. The folders may include one or more personal folders 902 (managed folders), search folders 904, and other types of folders.

In embodiments, the presentation component 204 may be operative to present the shell view 900 with a list of folders for a messaging application. When a folder is selected or activated, the shell view 900 may activate a property view 950 for the personal folder 902. The property view 950 may include a list of folder retention policies 952 available for the selected folder 902. The property view 950 may receive a selection for one of the folder retention policies. The selection may be made by a user. The selected folder retention policy may be passed to the tagging component 102 to tag the personal folder 902 with an expiration tag having expiration information used to expire the message in accordance with the selected folder retention policy. The tagging component 102 may apply the expiration tag to all data items currently associated with the personal folder 102, and for any data items associated with the personal folder 102 in the future. An example of the latter case may be when a user moves a non-tagged message to a tagged folder, the message inherits the expiration tag associated with the tagged folder. When a user moves a previously tagged message to a tagged folder, conflicts between expiration tags may be handled as previously described.

In addition to providing a list of retention policies, the property view 950 may also present a folder retention policy description field 954 with a folder retention policy description for a selected folder retention policy. In the illustrated embodiment shown in FIG. 9, the "Default Policy" may have a folder retention policy description with the following user interface string in the folder retention policy description field 954:

Policy: 1 year (E-mail), 180 days (Voicemail)
Purpose: Documents needed for day-to-day short-term working purposes where no legal obligation or ongoing business need exists.

This provides a user with a short description to assist the user in selected an appropriate folder retention policy for a given folder.

The shell view 900 may also provide user interface information that allows a user to quickly assess the results produced by the various retention policies. Since different retention policies may be applied to different data items and folders, a user may not know when a data item is going to expire and plan accordingly. The shell view 900 illustrates an example where the presentation component 204 generates a list of search folders 904. The search folders 904 may be generated using the search component 206 and the sorting component 210. For example, the search component 206 may search for expiration tagged messages 202 based on expiration tags for the expiration tagged messages 202, and the sorting component 210 may sort the expiration tagged messages 202 based on expiration information associated with expiration tags for the expiration tagged messages 202.

A search folder 904 may include a folder label 906 arranged to display expiration information for the expiration tagged messages 202 within the search folder 904. For example, a search folder 904 may hold search results for expiration tagged messages set to expire at a future time, such as days, weeks, months, years, and other temporal granularities. The folder label 906 may also indicate a number of expiration tagged messages within the search folder. For example, the shell view 900 may include multiple search folders 904 each having a folder label 906 indicating that six (6) messages are to expire today, thirty-six (36) messages are expiring in a week, and two-hundred and one (201) messages are expiring this month.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 10:
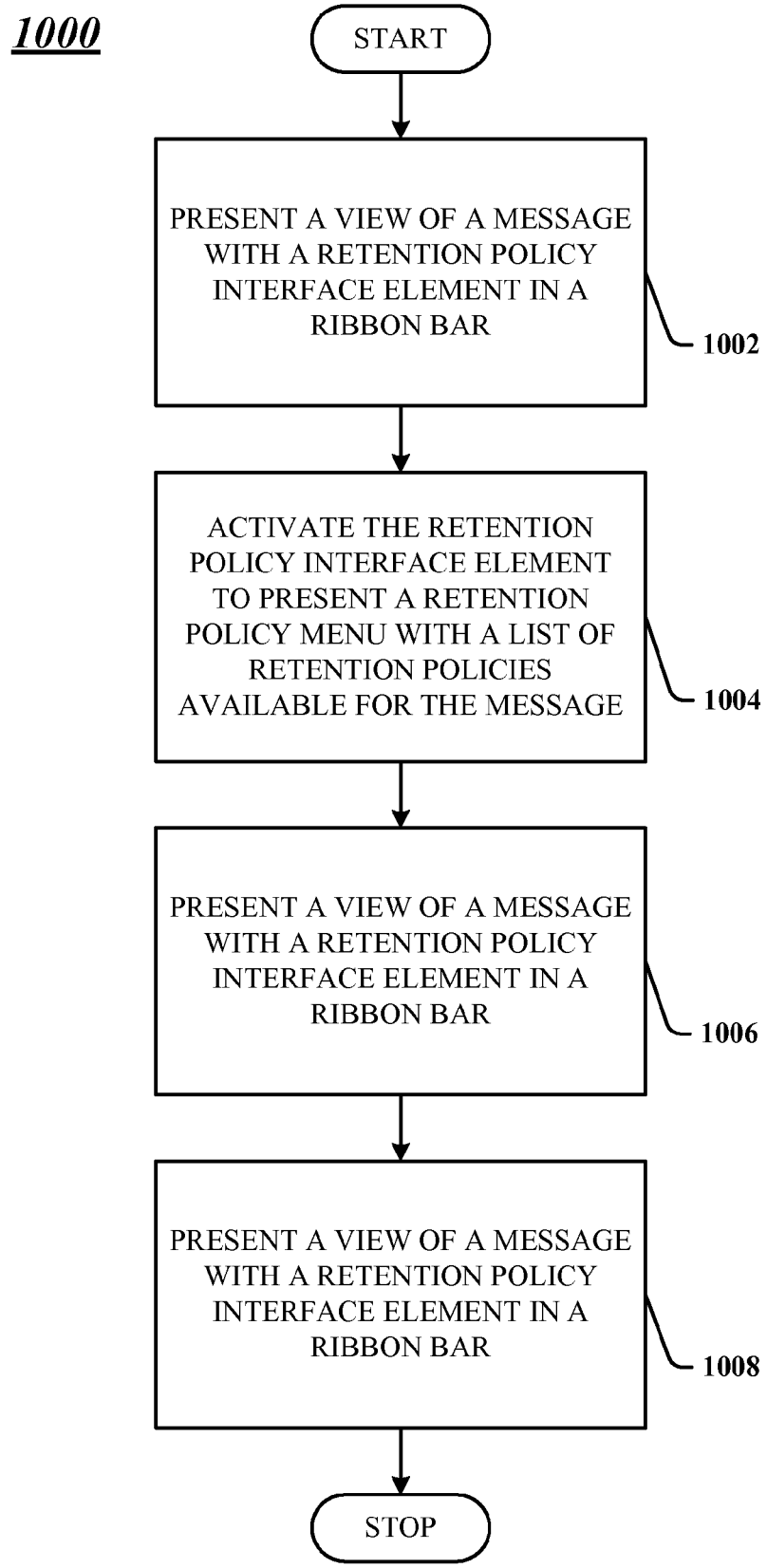
FIG. 10 illustrates an embodiment of a logic flow.

FIG. 10 illustrates one embodiment of a logic flow 1000. The logic flow 1000 may be representative of some or all of the operations executed by one or more embodiments described herein. For example, the logic flow 1000 may illustrate a technique for tagging a message with an expiration tag.

In the illustrated embodiment shown in FIG. 10, the logic flow 1000 may present a view of a message with a retention policy interface element in a ribbon bar at block 1002. For example, the presentation component 204 may present the compose interface view 800 of a message 810 with a retention policy interface element 822 in a ribbon bar 820.

The logic flow 1000 may activate the retention policy interface element to present a retention policy menu with a list of retention policies available for the message at block 1004. The presentation component 204 may activate the retention policy interface element 822, in response to a user selection, to present the retention policy menu 824 with a list of retention policies available for the message 810.

The logic flow 1000 may receive a selection for one of the retention policies from the retention policy menu at block 1006. For example, the presentation component 204 may receive a selection for one of the retention policies from the retention policy menu 824, and output the selected retention policy to the tagging component 102.

The logic flow 1000 may tag the message with an expiration tag having expiration information used to expire the message in accordance with the selected retention policy at block 1008. For example, the tagging component 102 may receive the selected retention policy from the presentation component 204, retrieve the appropriate expiration tag corresponding to the selected retention policy, and tag the message 810 with the expiration tag having expiration information needed to delete the message 810 in accordance with the selected retention policy.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 11:
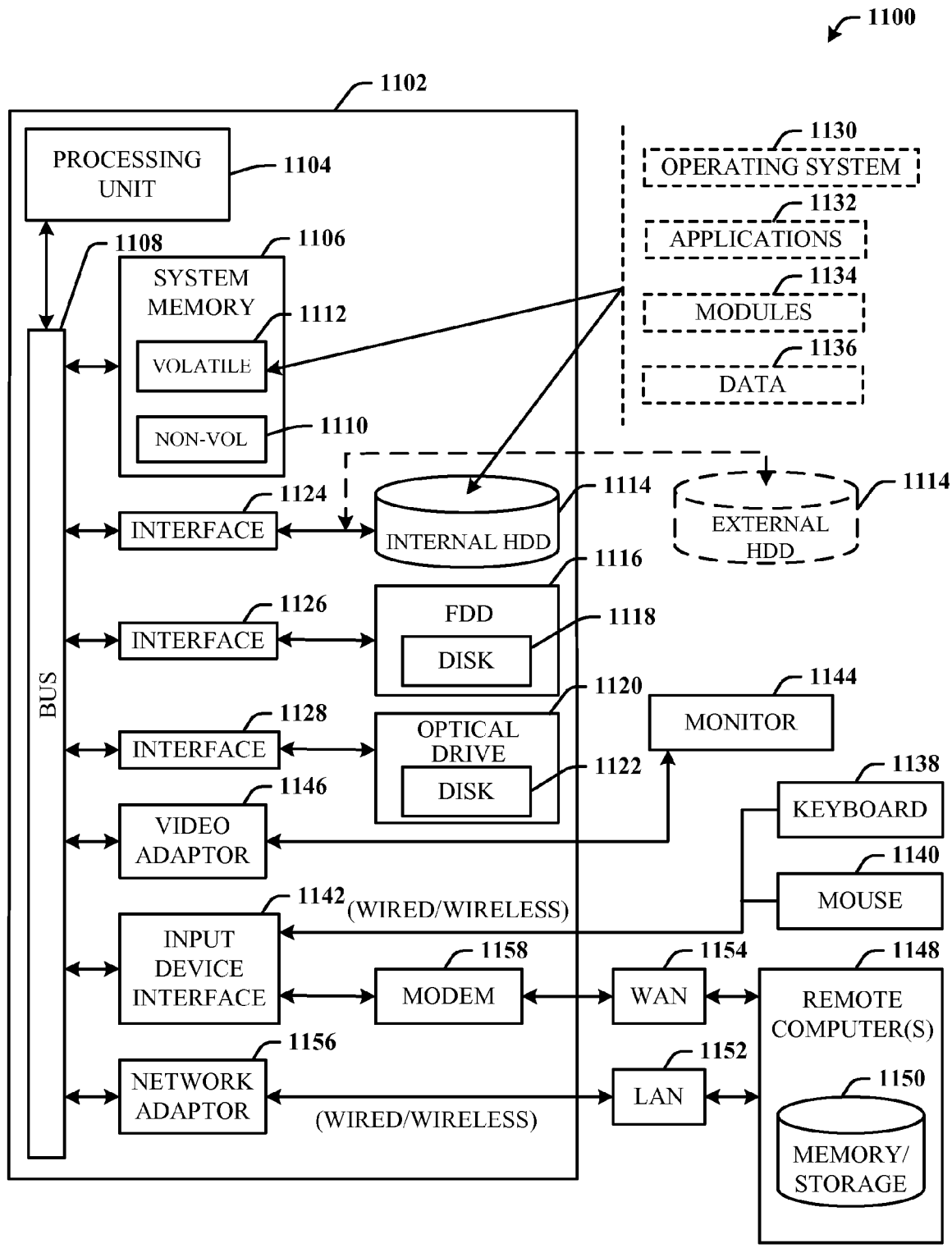
FIG. 11 illustrates an embodiment of a computing system.

Referring now to FIG. 11, there is illustrated a block diagram of a computing system 1100 operable to execute retention policy processing for data items in accordance with the disclosed architecture. In order to provide additional context for various aspects thereof, FIG. 11 and the following discussion are intended to provide a brief, general description of a suitable computing system 1100 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary computing system 1100 for implementing various aspects includes a computer 1102 having a processing unit 1104, a system memory 1106 and a system bus 1108. The system bus 1108 provides an interface for system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 can include non-volatile memory (NON-VOL) 1110 and/or volatile memory 1112 (e.g., random access memory (RAM)). A basic input/output system (BIOS) can be stored in the non-volatile memory 1110 (e.g., ROM, EPROM, EEPROM, etc.), which BIOS stores the basic routines that help to transfer information between elements within the computer 1102, such as during start-up. The volatile memory 1112 can also include a high-speed RAM such as static RAM for caching data.

The computer 1102 further includes an internal hard disk drive (HDD) 1114 (e.g., EIDE, SATA), which internal HDD 1114 may also be configured for external use in a suitable chassis, a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as a DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1112, including an operating system 1130, one or more application programs 1132, other program modules 1134, and program data 1136. The one or more application programs 1132, other program modules 1134, and program data 1136 can include the tagging component 102, criteria tagged items 104, retention component 106 (for client-based embodiment), the expiration tagged message 202, presentation component 204, search component 206, policy component 208, sorting component 210, client system 302, and client system 400, for example.

All or portions of the operating system, applications, modules, and/or data can also be cached in the volatile memory 1112. It is to be appreciated that the disclosed architecture can be implemented with various commercially available operating systems or combinations of operating systems.

A user can enter commands and information into the computer 1102 through one or more wire/wireless input devices, for example, a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, etc.

A monitor 1144 or other type of display device is also connected to the system bus 1108 via an interface, such as a video adaptor 1146. In addition to the monitor 1144, a computer typically includes other peripheral output devices (not shown), such as speakers, printers, etc.

The computer 1102 may operate in a networked environment using logical connections via wire and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, is connected to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 12:
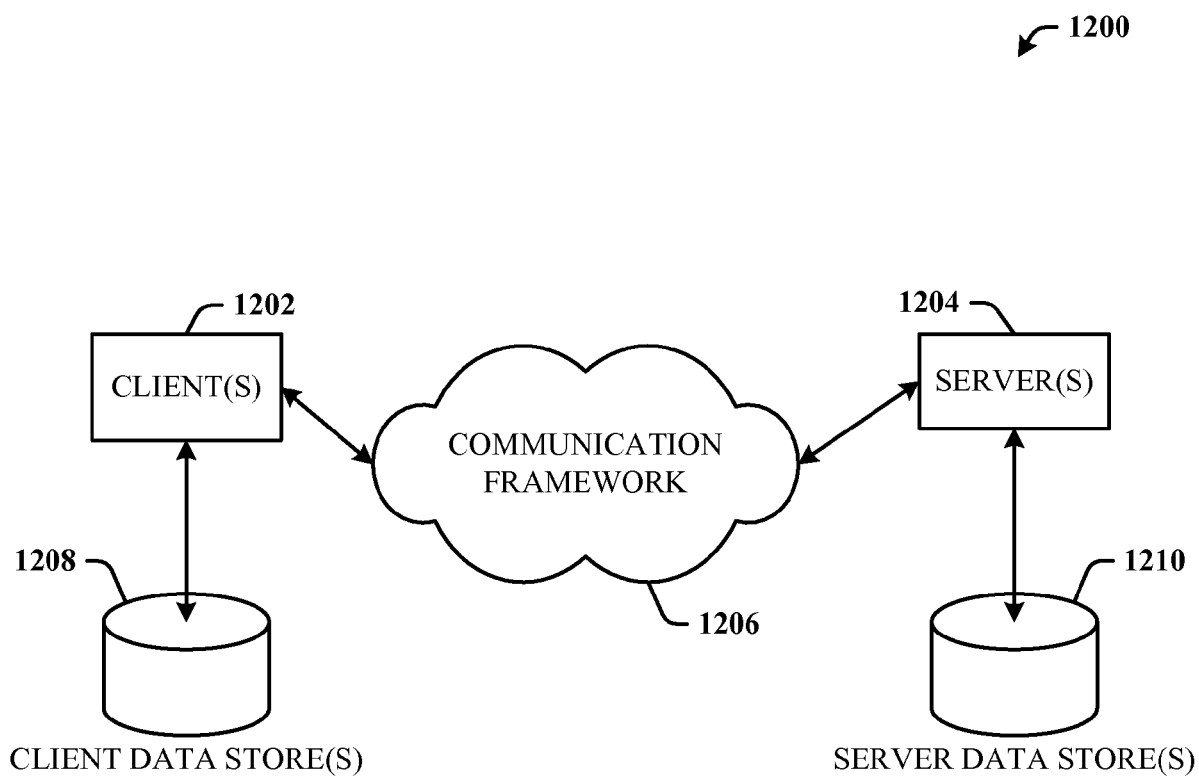
FIG. 12 illustrates an embodiment of a computing environment.

Referring now to FIG. 12, there is illustrated a schematic block diagram of an exemplary computing environment 1200 for client-server retention policy tagging. The environment 1200 includes one or more client(s) 1202. The client(s) 1202 can be hardware and/or software (e.g., threads, processes, computing devices). The client(s) 1202 can house cookie(s) and/or associated contextual information, for example.

The environment 1200 also includes one or more server(s) 1204. The server(s) 1204 can also be hardware and/or software (e.g., threads, processes, computing devices). The servers 1204 can house threads to perform transformations by employing the architecture, for example. One possible communication between a client 1202 and a server 1204 can be in the form of a data packet adapted to be transmitted between two or more computer processes. The data packet may include a cookie and/or associated contextual information, for example. The environment 1200 includes a communication framework 1206 (e.g., a global communication network such as the Internet) that can be employed to facilitate communications between the client(s) 1202 and the server(s) 1204.

Communications can be facilitated via a wire (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

The client(s) 1202 can include the client system 302 and client system 400. The server(s) 1204 can include the server system 304, which further includes the retention component 104 (for the client-server embodiment).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system to manage data, comprising: at least one processor operatively coupled to at least one memory to provide:

a tagging component configured to form an expiration tagged message including tagging a message with an expiration tag, the expiration tag having expiration information associated with a selected retention policy, the tagging component further configured to expire the expiration tagged message using the expiration information in accordance with the selected retention policy, wherein the selected retention policy supersedes both a default retention policy and a location-specific hierarchical retention policy preventing modification of the expiration information when the expiration tagged message is moved to a location having either the default retention policy or the location-specific hierarchical retention policy, the expiration tag including a retention period value, the presence of the retention period value indicating the expiration tagged message was explicitly tagged; and a presentation component communicatively coupled to the tagging component, the presentation component configured to present a view of the expiration tagged message with an expiration field having the expiration information for the expiration tagged message, the expiration information indicating the message will not expire when the retention period value equals zero.

2. The system of claim 1, the presentation component configured to present the view of the expiration tagged message with the expiration field having an expiration date for the message.

3. The system of claim 1, the presentation component configured to present the view of the expiration tagged message with the expiration field having a retention policy type for the message.

4. The system of claim 1, the presentation component configured to present the view of the expiration tagged message with the expiration field having an expiration time for the message.

5. The system of claim 1, the presentation component configured to present a reading pane view of the expiration tagged message with the expiration field positioned in a header portion for the expiration tagged message.

6. The system of claim 1, the presentation component configured to present an inspector view of the expiration tagged message with the expiration field positioned in a trailer portion for the expiration tagged message.

7. The system of claim 1, comprising a search component communicatively coupled to the presentation component, the search component configured to search for expiration tagged messages based on expiration tags for the expiration tagged messages.

8. The system of claim 1, comprising a sorting component communicatively coupled to the presentation component, the sorting component configured to sort expiration tagged messages based on expiration information associated with expiration tags for the expiration tagged messages.

9. The system of claim 1, comprising a retention component communicatively coupled to the tagging component, the retention component configured to expire the expiration tagged message when an expiration date is reached.

10. The system of claim 1, the presentation component configured to present a shell view configured to activate a property view displaying one or more folder retention properties.

11. The system of claim 10, the property view further configured to present a folder retention policy description field including a folder retention policy description for a selected folder retention policy.

12. The system of claim 1, the tagging component configured to update criteria information of a criteria tag based on a changed circumstance associated with a corresponding message.

13. The system of claim 1, comprising a policy component configured to facilitate the generation of one or more policies for management of the expiration tagged message.

14. The system of claim 1, comprising an event-based assistant configured to stamp expiration information to the expiration tagged message based on at least one of the selected retention policy, the default retention policy, or the location-specific hierarchical retention policy.

15. The system of claim 1, the expiration tag further including a journaling content setting configured to move the expiration tagged message to an archive.

16. A method, comprising:

forming, by at least one processor, an expiration tagged message, forming the expiration tagged message including tagging a message with an expiration tag, the expiration tag having expiration information associated with a selected retention policy, the expiration tag expiring the expiration tagged message in accordance with the selected retention policy, wherein the selected retention policy supersedes both a default retention policy and a location-specific hierarchical retention policy preventing modification of the expiration information when the expiration tagged message is moved to a location having either the default retention policy or the location-specific hierarchical retention policy, the expiration tag including a retention period value, the presence of the retention period value indicating the expiration tagged message was explicitly tagged; and presenting a view of the expiration tagged message with an expiration field having the expiration information for the expiration tagged message, the expiration information indicating the message will not expire when the retention period value equals zero, presenting the view including determining whether the retention period value equals zero.

17. The method of claim 16, further comprising searching for expiration tagged messages based on expiration tags for the expiration tagged messages.

18. The method of claim 16, further comprising sorting expiration tagged messages based on expiration information associated with expiration tags for the expiration tagged messages.

19. A computer storage medium, the computer storage medium storing computer-executable instructions that when executed by a computer cause the computer to:

form an expiration tagged message, forming the expiration tagged message including tagging a message with an expiration tag, the expiration tag having expiration information associated with a selected retention policy, the expiration tag expiring the expiration tagged message in accordance with the selected retention policy, wherein the selected retention policy supersedes both a default retention policy and a location-specific hierarchical retention policy preventing modification of the expiration information when the expiration tagged message is moved to a location having either the default retention policy or the location-specific hierarchical retention policy, the expiration tag including a retention period value, the presence of the retention period value indicating the expiration tagged message was explicitly tagged; and present a view of the expiration tagged message with an expiration field having the expiration information for the expiration tagged message, the expiration information indicating the message will not expire when the retention period value equals zero, presenting the view including determining whether the retention period value equals zero.

20. The computer storage medium of claim 19, further configured to:
expire the expiration tagged message when an expiration date is reached.

* * * * *